Feb. 9, 1965   A. J. WILTSHIRE   3,168,905
PLASTIC FITTINGS

Filed June 29, 1961   2 Sheets-Sheet 1

INVENTOR.
ARTHUR J. WILTSHIRE
BY Ely, Pearne & Gordon
Attorneys

Feb. 9, 1965   A. J. WILTSHIRE   3,168,905
PLASTIC FITTINGS
Filed June 29, 1961   2 Sheets-Sheet 2

INVENTOR.
ARTHUR J. WILTSHIRE
BY
Attorneys 3,168,905
PLASTIC FITTINGS
Arthur J. Wiltshire, Cleveland, Ohio, assignor to Structural Fibers, Inc., Chardon, Ohio, a corporation of Ohio
Filed June 29, 1961, Ser. No. 120,698
1 Claim. (Cl. 137—590)

This invention relates generally to plastic fittings, and more particularly to plastic fittings which are intended to be used to form pipe connections to fiber-reinforced plastic tanks, such as domestic water softener tanks and hot water tanks.

Heretofore, it has been the conventional practice to construct fittings of the type described from brass or other metal and to thread the fittings into tapped holes formed in the walls of the plastic tanks. Since metal fittings may have a modulus of elasticity of from 8 to 10 times that of the fiber-reinforced plastic tanks (for example, $12 \times 10^6$ p.s.i. as compared to $1.5 \times 10^6$ p.s.i.), the walls of the tanks tend to "walk away" from the fittings when the tanks are expanded by internal pressures. That is, the tapped holes in the walls of the tank will expand or pull away from the metal fittings to result in leaky, unsatisfactory connections.

Prior art attempts to overcome the foregoing problem and to maintain a fluid seal between the metal fittings and the plastic tanks have included forming the fittings with a peripheral flange or collar which is milled to have a conical side surface for seating a pliable, specially molded washer or gasket. In use, the fittings have been tightly threaded into the walls of the tanks so as to forcibly compress the washers between the conical seating surfaces and the exterior surfaces of the tank walls. In most instances it also has been necessary to provide a separate metal ring around the washer to prevent it from expanding radially outwardly of the fitting when the washer is forcibly compressed.

When tanks of the type described are subjected to the water line pressures, the metal fitting and washer assemblies of the prior art usually are not capable of maintaining a fluid-tight seal and thus permit at least some undesirable leakage around the fitting. Moreover, the special construction of these conventional fitting assemblies have made them inordinately expensive components of the tank structures.

The conventional fitting assemblies also have made it necessary to "spot-face" the tank walls by milling a flat area around the tapped holes so that the rubber washers can firmly seat against the external wall surfaces of the tanks. This spot-facing or milling operation has a tendency to structurally weaken the tanks, since the material which is removed decreases their hoop strength and results in a sharp discontinuity in wall thickness of the tanks. In order to compensate for the material which is removed and thus prevent the tanks from splitting longitudinally under internal pressures, it has been the usual practice to thicken the tank walls in the regions where the tapped holes are subsequently formed. In accordance with the manufacturing procedures for producing molded, fiber-reinforced plastic tanks as disclosed in Patent No. 2,977,268 of Donald W. Randolph, granted April 27, 1961, this has been accomplished by laying up separate pads of uncompressed, fibrous reinforcing material within an assembly of fiber matting forms prior to pressure-compacting and impregnating them with a liquid, settable resin. For example, in a typical instance where ³⁄₃₂ of an inch of material is removed by the spot-facing operation, at least ⅜ of an inch of uncompressed reinforcing material must be added to the walls of the tank during its manufacture.

In the specific application of domestic water softener tanks, holes are usually drilled and tapped in the side walls of the tanks near their lower ends to facilitate connection of pipes through which the soft water is emitted. When forming the pipe connection, it is customary to connect a generally S-shaped distributor tube to the fitting so that the inner projecting end of the tube extends to a position closely adjacent the bottom wall of the tank. Heretofore, it has been difficult to thread the conventional fittings into the tapped holes the exact distance required to compress the pliable sealing washers and, at the same time, to rotationally adjust the fittings so that the attached distributor tubes are properly located within the tanks.

A principal object of the present invention is to provide improved fittings for forming fluid-tight connections of pipes to plastic pressure vessels.

Another object of the invention is to provide an improved fitting of the type described in the previous paragraph which may be threadedly connected into the walls of fiber-reinforced plastic pressure tanks without requiring special milling operations on the tanks which, heretofore, have structurally weakened them and contributed to their ultimate failure.

Still another object of the invention is to provide fittings for plastic tanks which offer improved performance over conventional metal fittings and, at the same time, are less expensive and easier to install.

A further object is to provide pipe connection fittings which are particularly adapted to installation in plastic water softener tanks and which are specifically constructed to effect a non-turbulent flow of water from the tanks.

In general, the foregoing objects are attained by forming the fittings from a plastic material which is selected to have a lower modulus of elasticity than the plastic tank in which the fitting is installed. Because of the difference in the relative moduli of elasticity, the fittings will expand more rapidly than will the tanks when subjected to internal pressures. As a result, a fluid-tight connection may be assured between the fittings and the tank walls without employing the relatively complex and expensive fitting assembly constructions of the prior art.

Another advantage is that plastic fittings made according to the invention may be installed to effect a fluid-tight connection without milling or spot-facing the tank walls. The elimination of this conventional spot-facing operation on plastic tanks reduces the cost of their manufacture, improves their strength, and reduces the wall thickness or bulk which has been required in the walls of the tanks around the tapped holes.

Other objects and advantages of the invention will become apparent from the following detailed description and the accompanying drawings.

Figure 3:
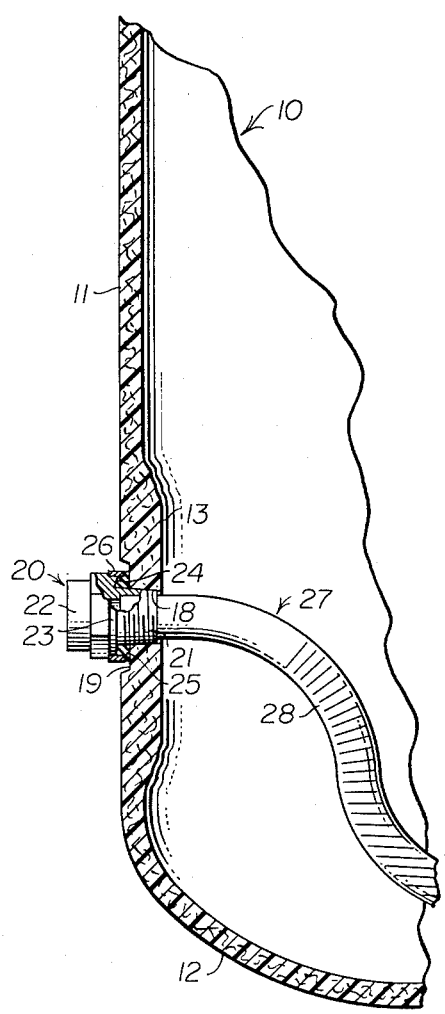
FIGURE 3 is an enlarged, fragmmentary cross-sectional view of a tank similar to that of FIG. 1, but illustrating the conventional metal fitting connection of the prior art.

Reference is first made to FIG. 3, which illustrates the prior art practice according to which pipe connections to plastic tanks were made by means of metal fittings. Reference numeral 10 designates a fiber-reinforced plastic water softener tank having a cylindrical side wall 11, a bottom wall 12, and a top wall (not shown) generally corresponding to the bottom wall. In accordance with the manufacturing procedures disclosed in the above-identified Randolph patent, the construction of the tank 10 is shown to include a thickened side wall portion 13 which may be formed by laying-up pads of fibrous reinforcing material against the inner surface of an assembly of fiber matting forms which is substantially in the shape of the finally molded tank, and then compacting and impregnating the pads and matting forms with a settable resin.

After the tank 10 has been produced in the manner generally discussed above, a tapped hole 18 is formed through the thickened side wall portion 13, and the outer surface of the side wall 11 is milled or spot-faced to provide a flat outer surface 19 around the hole. Up to 3/32 of an inch or more material has been removed by this spot-facing operation which, as noted above, has often deleteriously affected the strength of the tank by decreasing its hoop strength.

The conventional metal fitting 20 for forming a pipe connection to the tank is shown to include an externally threaded, male end 21 which is threaded into the accommodating hole 18, and an opposite female end 22 into which a pipe (not shown) may be connected. The fitting 20 is formed with an integral peripheral step 23 having a conical end surface 24, and a specially molded sealing washer 25, formed of rubber or the like, is mounted on the male end 21 of the fitting in position to be compressed between the flange 23 and the tank wall 11 when the fitting is threaded into the tapped hole 18. A metal ring 26 is usually installed around the washer 25 to prevent it from expanding radially outwardly.

As explained above, it has been found that the tank 10, which has a substantially lower modulus of elasticity than the metal fitting 20, expands relatively rapidly when the pressure in the tank builds up, thus causing the wall 11 to pull away from the fitting and permitting fluid leakage. This inherent defect has, in the past, been only partially remedied by the provision of the sealing washer 25, which is intended to be compressed against the spot-faced area 19 to prevent fluid leakage around the male end 21 of the fitting.

There is also shown in FIG. 3 the generally S-shaped distributor tube 27 which has one end inserted into the fitting 20 with a slotted length 28 extending downwardly toward the bottom wall 12 of the tank. Water, which has been softened by filtering down through a suitable bed in the tank, is discharged through the distributor tube 27. It is therefore essential to the proper functioning of the soft water tank 10 that the slotted end 28 of the tube be positioned near the bottom wall 12.

However, when threading the fitting 20 into the hole 18 to compress the washer 25, it is difficult to assure that the inner projecting end 28 of the attached distributor tube 27 will be properly positioned, since it will obviously rotate as the fitting is turned. For example, it frequently occurs that the end 28 of the tube will project upwardly instead of downwardly when the fitting has been threadedly advanced into the hole 18 the proper amount. In such instances, the fitting may be either backed off, which obviously increases the chance of water leaking from the tank around the fitting, or it may be threadedly advanced an additional distance into the hole which may distort and unduly stress the tank wall by compressing and crushing the reinforced plastic material.

Figures 1, 2:
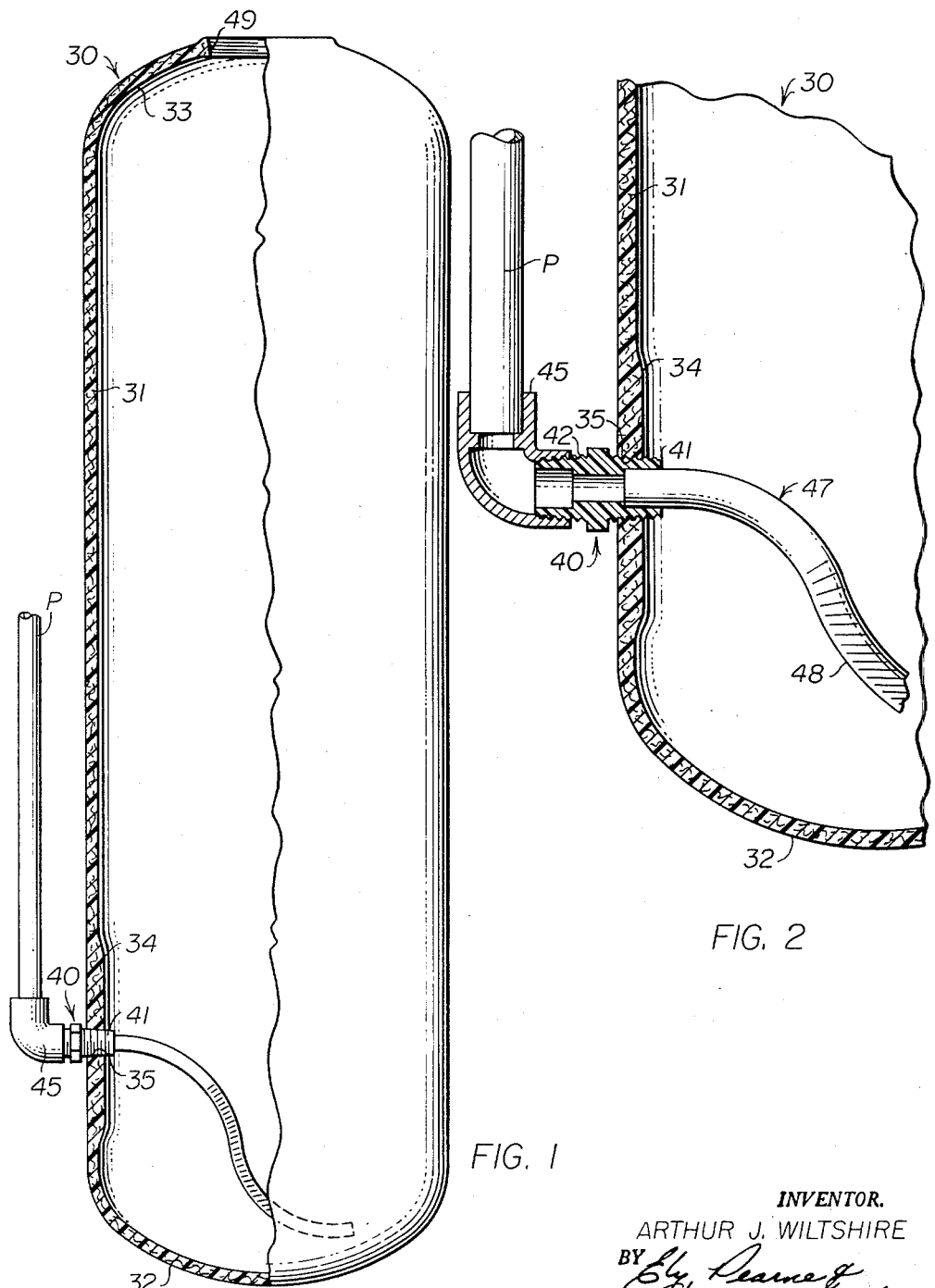
FIGURE 1 is a side elevational view, partially in cross-section, of a fiber-reinforced plastic water softener tank in which is installed a fitting made in accordance with the invention.
FIGURE 2 is an enlarged, fragmentary view of the tank and fitting assembly shown in FIG. 1.

Reference is now made to FIGS. 1 and 2 which illustrate one embodiment of the invention for forming a connection of the pipe P to the tank 30. The tank 30 is similar to the above described tank 10 and includes a cylindrical side wall 31, a bottom wall 32 and a top wall 33. A lower portion 34 of the side wall 31 is of relatively thick cross-section and through this thickened side wall portion is formed a tapped hole 35.

Threaded into the hole 35 is a molded plastic fitting 40 which is preferably formed with externally threaded male ends 41 and 42 (FIG. 2). In accordance with the invention, the plastic fitting 40 has a modulus of elasticity which is less than that of the tank 30 and which is preferably less than $1 \times 10^6$ p.s.i. Thermoplastic, including nylon molding compounds, acetal resins such as Delrin (E. I. du Pont de Nemours & Co.), polycarbonates such as Lexan (General Electric Co.), and similar resins, have been found particularly suitable for the purposes of the present invention because of their molding qualities, low moduli of elasticity, resistance to moisture absorption, and generally good mechanical properties.

In use the fitting 40 need only be threaded into the hole 35 a sufficient distance to prevent water under static pressure from leaking around it. When the pressure in the tank is increased, the fitting 40 will tend to expand more rapidly than the hole 35 because of its relatively low modulus of elasticity and will thus be restrained by the surrounding tank structure and maintain a fluid-tight connection. Inasmuch as the modulus of elasticity of the fitting 40 also is less than that of the metal elbow 45 which receives the threaded male end 42 of the fitting, the relatively greater expansion of the fitting than of the elbow acts in a similar manner to maintain a fluid-tight connection therebetween under varying pressures.

The ability of the plastic fitting 40 to maintain a fluid-tight connection with parts having higher moduli of elasticity affords several unexpected advantages in the specific illustrated environment wherein the fittings are installed in plastic pressure vessels, and, particularly fiber-reinforced plastic water softener tanks. For example, since an exact threaded position of the fitting 40 within the hole 35 is not critical, the generally S-shaped distributor tube 47, which corresponds to the previously described tube 27 of FIG. 3, may be easily assembled and located in the proper manner with its inner end 48 extending toward the bottom wall 32 of the tank. In so doing, it is merely necessary to mark a visible, external portion of the fitting with a line or the like which indicates a rotational position in which the tube extends downwardly within the tank. The fitting 40, with the tube 47 attached thereto, may be then threaded into the hole 35 until it is tight and the mark on the fitting indicates that the tube is properly located.

Another advantage will be apparent by considering FIGS. 2 and 3 in conjunction. As shown in FIG. 2, the fitting 40 may be installed in the tank 30 without spot-facing its outer surface around the hole 35. The elimination of this machining operation reduces the cost of manufacturing the tanks, and, at the same time, improves their strength, since sharp discontinuities in the wall thickness, which may adversely affect the resistance of the tanks to fatigue, are avoided. Concomitantly, the thickness of the side wall portion 34 need not be as great as illustrated in FIG. 3 so that a saving of material is effected.

Figure 4:
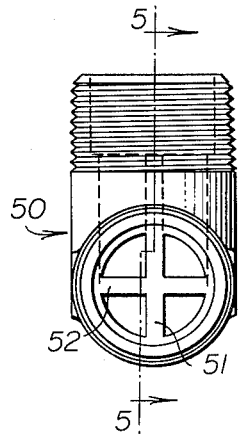
FIGURE 4 is an end view of a modified construction of the plastic fittings comprising the invention.
Figure 5:
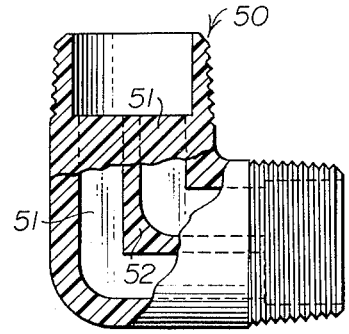
FIGURE 5 is a side view of the fitting of FIG. 4, shown partly broken away and partly in section taken along the line 5—5 of FIG. 4.

It will be apparent from the foregoing description that the fitting 40 may be of many shapes than the "straight-through" connection illustrated in FIGS. 1 and 2, and that the fittings constructed according to the invention may be used to form other types of connections. For example, the fittings may be in the form of elbows, as shown in FIGS. 4 and 5, T's, and so forth. The fittings also may be used to form pipe connections with a threaded hole 49 in the top wall 33 of the tank, or, in general, to form connections with any parts having higher moduli of elasticity.

In the modified construction illustrated in FIGS. 4 and 5, a plastic elbow fitting 50 is formed with axially extending partitions 51 and 52. These partitions, which are shown as being disposed at right angles to each other, advantageously affect the flow characteristics of the liquid which is conducted from the tanks under pressure. More particularly, the partitions 51 and 52 act to break up the swirling action of the water passing through the fitting and thus materially reduce the turbulent flow of the stream. Instead of constructing the fitting 50 with two, right angularly disposed internal partitions, the fitting may be formed with only one partition, or it may be formed with two or more partitions, relatively disposed at angles other than 90°.

A particular advantage of both embodiments of this invention is that the plastic fittings may be readily molded in finished form and are considerably less expensive than the relatively complex metal fitting assemblies of the prior art.

Many additional modifications and variations of the invention will obviously be apparent to those skilled in the art in view of the foregoing detailed disclosure. Therefore, it is to be understood that, within the scope of the appended claim, the invention may be practiced otherwise than as specifically shown and described.

What is claimed is:

A water softener tank assembly comprising a fiber-reinforced plastic tank, said tank having a top wall, a bottom wall, and a cylindrical side wall, said side wall having a threaded hole formed therethrough, a pipe fitting having a male end threadedly engaged within said hole, said fitting being formed of plastic and having a lower modulus of elasticity than the material of said tank so that its male end will expand within said hole when subjected to internal fluid pressure, and such expansion will be restrained by the surrounding material of the tank to thereby maintain a fluid-tight connection, and a distributor tube, said tube having one end engaged within said male end of said fitting and having its other end extending downwardly within said tank to a position closely adjacent said bottom wall.

References Cited by the Examiner
UNITED STATES PATENTS

| 2,340,926 | 2/44 | Bradley | 285—423 X |
| 2,566,502 | 9/61 | Smith | 137—317 X |
| 2,580,818 | 1/52 | Mundy | 285—40 |
| 2,786,643 | 3/57 | Carlstedt | 251—144 |
| 2,988,321 | 1/61 | Gilmont | 251—368 X |

FOREIGN PATENTS

| 435,425 | 9/35 | Great Britain. |
| 633,182 | 12/49 | Great Britain. |

M. CARY NELSON, *Primary Examiner.*